April 2, 1968
J. F. WALTER
3,376,532
PROTECTIVE COVER FOR RELATIVELY MOVABLE
CONDUCTIVE MEASURING SCALES
Filed June 16, 1965
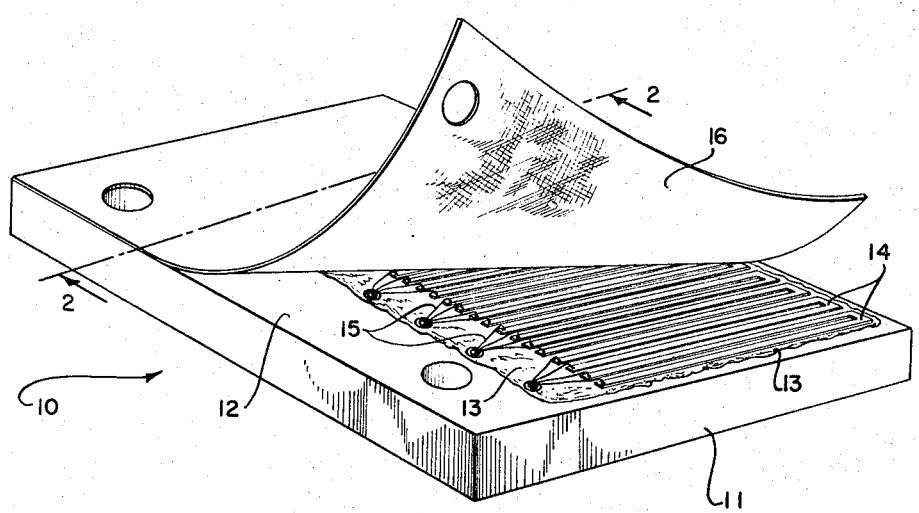
FIG_1
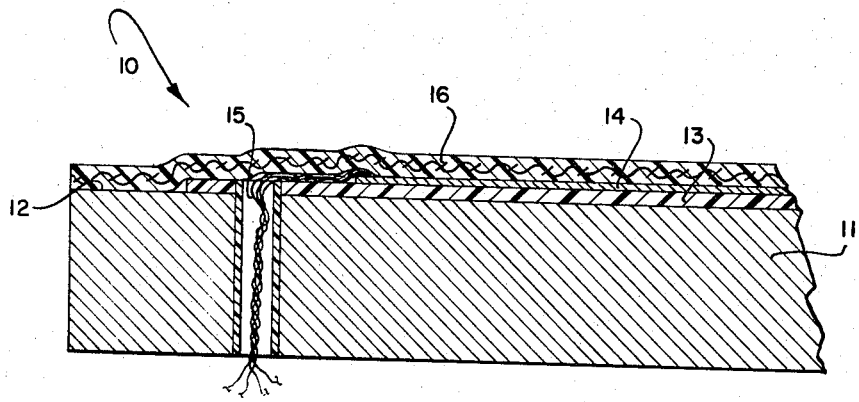
FIG_2
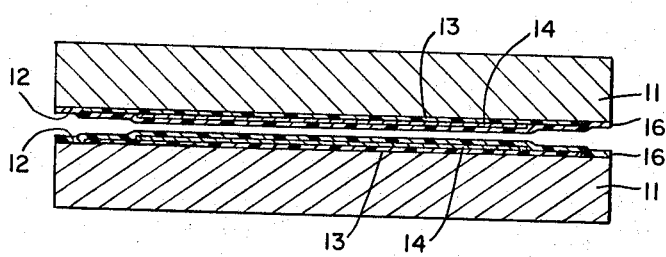
FIG_3
INVENTOR.
JOHN F. WALTER
BY
*George Sullivan*
Agent

# United States Patent Office 3,376,532
Patented Apr. 2, 1968

3,376,532
PROTECTIVE COVER FOR RELATIVELY MOVABLE CONDUCTIVE MEASURING SCALES
John F. Walter, Atlanta, Ga., assignor to Lockheed Aircraft Corporation, Burbank, Calif.
Filed June 16, 1965, Ser. No. 464,504
1 Claim. (Cl. 336—115)

This invention relates in general to a protective covering for a measuring scale and in particular to a protective covering for an electrically conductive measuring scale of the type having one or more electrically conductive members located on an exterior surface thereof.

The use of electrically conductive measuring scales to provide an electrical signal yielding a precise measurement of a linear or angular displacement is well known in a number of diverse arts. In the metalworking industry, for example, and especially with respect to multi-axis numerical control machine tools, such scales are used to provide an electrical signal indicating the position or extent of displacement of a workpiece with respect to the cutting tool or another datum point. Such machine tools frequently are programmed to perform, without the intervention of an operator, a number of operations on a workpiece with the electrical signals from the electrically conductive measuring scales being supplied to appropriate control circuitry to ensure the proper positioning and movement of the workpiece with respect to the cutting tool.

Another example of an application of electrically conductive measuring scales is found in movable antennas as used, for example, in radar, where the orientation of the antenna with respect to a datum must be accurately and precisely determinable. In the case of a rotating antenna, for example, circular electrically conductive measuring scales may be used to provide an electrical signal yielding an accurate and precise indication of the antenna orientation.

Examples of such electrically conductive measuring scales, also referred to as "position measuring transformers," are found in U.S. Patent No. 2,799,835, to Tripp et al., and No. 3,064,218, to Farrand. These scales consist of a base member having on at least one side thereof an arrangement of a metallic conductor or conductive elements which are formed by a suitable process such as photo-etching or the like and which are relatively thin and susceptible to injury. A typical application of such scales finds a first scale being mounted relatively movable to a second scale with the conductive elements of the two scales facing each other and in close proximity thereto, the spacing between opposing scale faces being only that which enables free movement of the scales with respect to one another. This close spacing is desirable to provide effective electrical coupling between the fixed scale and the movable scale. Of course, it is understood that whichever of the two scales is fixed and whichever is movable is immaterial to the operation of a measuring system utilizing such scales. A suitable electric current is passed through the conductive elements of one of the scales and the voltage induced in the conductive elements of the opposed and facing scale is indicative of the relative positioning of the two scales.

Scales of this type frequently are used on apparatus and/or in environments wherein it is difficult or impossible to protect the scales from dust, dirt, corrosive substances, metal chips or other foreign substances. For example, use of such scales on a machine tool means that the scales inevitably are subjected to the coolant or cutting oil used in the machining process and also to the chips produced by the removal of metal from the workpiece, in addition to the other contaminants generally present in the environment of a machine shop. Even though the fixed and movable scales of a pair of scales are situated on the machine tool so as to be relatively sheltered from chips and coolant or cutting fluids, these foreign substances almost inevitably find their way to the scale area.

Because the spacing between the fixed and movable scales may be on the order of 0.006 inch and additionally because the conductive elements on the scale, being relatively thin, are easily damaged by cutting or scratching, the presence of even a tiny chip or other sharp particle on one of the scales can cause cutting or other damage to the conductive elements when the other scale passes over this chip. Once the conductive element has been cut, of course, current no longer can flow therethrough, and the scale arrangement no longer functions to provide an accurate indication of the positioning of the apparatus. In the case of a machine tool, this may mean that parts produced by the tool will be dimensionally incorrect or that the movable portions of the tool will attempt to position themselves in such a way as to cause severe damage to the tool or to the workpiece; a workpiece as machined on such tools may be valued as highly as $10,000 because of the previous time invested in producing the workpiece. Even if none of these events occur, the damage to the electrically conductive measuring scale renders inoperative a machine or apparatus which by its nature is relatively complex and expensive and the inoperativeness of which is exceedingly expensive in terms of lost machine time. Furthermore, the electrically conductive measuring scales themselves are quite expensive to purchase, and the necessity of precise alignment of the scales on the machine means that the cost of scale replacement is additionally increased by the time required to fit a new scale to the machine.

Solutions thus far proposed to overcome the foregoing problems have involved the application of various coatings such as varnish, shellac, or the like to the surfaces of the scales in an attempt to protect the conductive elements thereon from being cut or damaged. However, such coatings are easily cut by such foreign particles as sharp-edged metal chips, especially in view of the relatively thin coating necessitated by the close spacing of the scales, and the various varnishes and shellacs that have been suggested have been found to be chemically attacked by the cutting oils or coolants used in the machining process. Furthermore, varnishes and shellacs or substances of this type also tend to provide only marginal protection against chip damage.

The problem of damage to the conductive elements of electrically conductive measuring scales has been substantially reduced or eliminated and the deficiencies of prior art solutions to this problem have been overcome according to the present invention, wherein the surface of the scale bearing the electrically conductive elements is partially or completely covered with a thin fibrous sheet having properties which are resistant to damage by cutting or by the corrosive effect of chemicals.

Accordingly, it is an object of this invention to provide an improved electrically conductive measuring scale.

Another object of this invention is to provide an electrically conductive measuring scale which may be effectively used in an environment containing foreign substances injurious to the electrically conductive elements or to other portions of such scales.

A further object of this invention is to provide an electrically conductive measuring scale which is highly resistant to damage of the electrically conductive elements thereon.

Still another object of this invention is to provide an electrically conductive measuring scale having electrically conductive elements which are effectively protected against damage caused by the introduction of foreign objects between opposed surfaces of adjacently positioned relatively movable scale members.

Yet another object of this invention is to provide an improved protective cover for an electrically conductive measuring scale.

A still further object of this invention is to provide a protective cover for an electrically conductive measuring scale whereby the electrically conductive elements of the scale are effectively protected from injury caused by foreign objects capable of cutting or otherwise damaging the electrical elements.

Yet another object of this invention is to provide a protective cover for an electrically conductive measuring scale which effectively protects the electrically conductive elements of the scale from damage without materially affecting the electrical dielectric coupling characteristics of the scales as applied to an existing apparatus.

The exact nature of this invention as well as other objects and advantages thereof will be readily apparent from consideration of the following specification relating to the annexed drawing in which:

FIGURE 1 shows a perspective view of an electrically conductive measuring scale having a protective cover according to this invention;

FIGURE 2 shows a section view taken along line 2—2 of FIGURE 1; and

FIGURE 3 is a vertical section view similar to that of FIGURE 2; however showing a pair of measuring scales according to the present invention in normal operating position.

Stated generally, the embodiment of this invention set forth herein comprises a cover made of a fibrous material such as glass fiber applied to an electrically conductive measuring scale in such a way as to cover and protect all of the electrically conductive elements of the scale. The protective coating, which preferably should be of a material having a relatively low dielectric constant so as to minimize the effect of the coating on the inductive interaction between the fixed and movable scales, is sufficiently thin to permit application of the coating to the scales without the need for increasing greatly the inter-scale spacing.

Stated more specifically and with reference to FIGURES 1 and 2 of the drawing, the embodiment of the invention as set forth herein relates to and comprises an electrically conductive measuring scale shown generally by 10 and having a base 11 which may be made of a metal such as brass or, alternatively, may be made of a nonconductive substance such as glass or ceramic. Contained on a surface 12 of base 11 is an insulative layer 13. This layer 13, which is required with a base 11 made of metal and which is optional with a base made of a nonconductor, may be of any suitable substance and covers at least a portion of surface 12.

Disposed on insulative layer 13 are a plurality of electrically conductive elements 14 configured to provide the desired electrical signal indicative of the relative position of a pair of opposed scales when the scales are connected with the appropriate circuitry. The configuration of conductive elements 14 depicted in the drawing is intended to be by way of example only, inasmuch as such configuration comprises no part of this invention. Suitable electrical leads 15 connect the conductive elements to the remainder of the electric circuitry. The electrically conductive elements 14 usually are applied to insulative layer 13, or to surface 12 where appropriate, by means of conventional etched circuit techniques so that each portion of these conductive elements represents a relatively thin layer of conductive metal.

The foregoing in substance describes an electrically conductive measuring scale of the type known to those skilled in the art. To such a scale, according to this embodiment of the invention, there is added a protective cover 16 made of a thin fibrous sheet of material such as glass fiber or the like. Although protective cover 16 is depicted as encompassing substantially the entire area of surface 12, cover 16 alternatively may only cover that portion of surface 12 on which electrically conductive elements 14 are disposed inasmuch as the primary function of cover 16 is the protection of these elements.

A protective cover made of a fibrous material such as glass fiber has proved to be extremely tough, highly resistant to cutting or other damage by chips or similar foreign particles introduced between fixed and movable scale members, and such a cover is relatively impervious to and chemically unaffected by cutting oils, coolants, or other similar substances. In the case of a protective cover 16 made of glass fiber, the glass fiber sheet may be applied to the measuring scale according to conventional fabricating techniques; it has been found that vacuum application causes the glass fiber sheet to adhere to the base uniformly and with a minimum of unnecessary protrusion above the surface 12 thereof.

In an example of the use of electrically conductive measuring scales in the machine tool art, such scales as existed in the prior art are associated with fixed and movable portions of a machine with an exemplary clearance between the electrically conductive elements of the fixed scale and the electrically conductive elements of the movable scale, sometimes called the "slider," on the order of 0.006 inch. The surfaces of each of the fixed scale and the movable scale were provided with a protective cover comprised by a glass fiber mat having a nominal thickness of 0.003 inch. This glass fiber mat was coated with resin and applied under a vacuum according to conventional glass fiber fabricating techniques. The spacing between the fixed and movable scales then was increased to approximately 0.0075 inch to accommodate the increased thickness of the scales due to the application of the protective cover.

As of the present time, a machine fitted with scales having a protective cover according to the foregoing embodiment has been in substantially daily operation for nearly six months without a measuring scale failure of any kind. This is in sharp contrast to the experience gained with this machine using scales of the prior art not equipped with this protective cover but operating under substantially similar conditions wherein, on the average, one or two scale failures per month could be expected. When the overhead cost of such a machine is considered to be in the order of fifty dollars ($50.00) per hour, the economic worth of any device which materially decreases the amount of down-time encountered with the machine immediately becomes apparent.

Inasmuch as the displacement resolution of electrically conductive measuring scales is a function, among other things, of the spacing between the fixed scale and the movable scale, the protective cover applied to the scales should be sufficiently thin that this spacing is not appreciably increased. The use of a glass fiber mat of 0.003 inch thickness, as given above, is by way of example only, and it will be appreciated that covers of greater or lesser thickness may be used. It may be found expedient to apply a cover sheet of substantially greater thickness than is desired and then to grind the outer surface of this cover sheet until the desired cover thickness is reached. Grinding of the cover also provides the advantage that the outer surface of the cover may be more nearly flat than would be the case with an unground cover of equivalent thickness as applied.

So as to minimize the effect on the electrical interaction of the fixed and movable scale members, the protective cover preferably should have a dielectric constant as close as practicable to that of air. Glass fiber has been found to have an acceptably low dielectric constant for this requirement.

Although the foregoing description has been directed to electrically conductive measuring scales in which inductive coupling is employed between the fixed and the movable scale members, it will of course be understood by those skilled in the art that the foregoing teachings relating to the protective covering of such scales may equally well be applied to scales of the type wherein capacitive coupling is employed between the fixed and movable scale members thereof.

It should be understood, of course, that the foregoing relates to only a preferred embodiment of the invention and that numerous modifications or alterations may be made therein without departing from the spirit and the scope of the invention as set forth in the appended claim.

What is claimed is:

1. In a displacement measuring system including a first scale member movable in a predetermined path of travel with respect to a second scale member, the improvement comprising: the construction of each of said scale members to include a base member, at least one electrically conductive member insulatively disposed on a surface of each of said base members, and an overlying protective resin bonded glass fiber cover secured to each of said electrically conductive members, the first and second scale members being adapted to be mounted such that said resin bonded glass fiber covers face one another in closely spaced apart relationship defining a predetermined clearance therebetween, the coverage of said surfaces by their respective protective covers being at least coextensive with the coverage of said surfaces by their respective conductive members, each said protective cover being of a composition having sufficient resistance to penetration that each conductive member is substantially protected from damage resulting from the introduction of a foreign abrasive particle in the clearance aforesaid.

References Cited

UNITED STATES PATENTS

| 2,861,911 | 11/1958 | Martin et al. | 174—117.5 |
| 3,090,934 | 5/1963 | Farrand | 336—129 |
| 3,202,943 | 8/1965 | Farrand | 336—200 |

LARAMIE E. ASKIN, *Primary Examiner.*

T. J. KOZMA, *Assistant Examiner.*